(12) United States Patent
Lamm et al.

(10) Patent No.: US 6,329,633 B1
(45) Date of Patent: Dec. 11, 2001

(54) METHOD AND MATERIAL FOR PROCESSING A COMPONENT FOR LASER MACHINING

(75) Inventors: Foster P. Lamm, South Windsor; John H. Vontell, Manchester; Joseph Bak, Eastford; James Whitton, East Berlin, all of CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 09/213,591

(22) Filed: Dec. 17, 1998

Related U.S. Application Data

(60) Provisional application No. 60/109,176, filed on Nov. 20, 1998.

(51) Int. Cl.[7] .................................................. B23K 26/00
(52) U.S. Cl. ................................. 219/121.71; 219/121.7; 219/121.85
(58) Field of Search ..................... 219/121.71, 121.7, 219/121.85; 29/889.721

(56) References Cited

U.S. PATENT DOCUMENTS

| | | | |
|---|---|---|---|
| 4,156,807 | 5/1979 | Howard et al. .................... 219/121 |
| 4,239,954 | * 12/1980 | Howard et al. ............ 219/121 EH |
| 4,256,444 | 3/1981 | Suter .................................... 425/73 |
| 4,857,698 | 8/1989 | Perun ............................. 219/121.71 |
| 4,873,414 | * 10/1989 | Ma et al. .......................... 219/121.7 |
| 5,011,626 | * 4/1991 | Ma et al. ...................... 219/121.7 X |
| 5,049,722 | * 9/1991 | Corfe et al. ................... 219/121.71 |
| 5,140,127 | * 8/1992 | Stroud et al. ................. 219/121.71 |
| 5,222,617 | * 6/1993 | Gregory et al. .............. 219/121.71 |
| 5,368,634 | * 11/1994 | Hackett ............................. 95/266 X |
| 5,511,721 | * 4/1996 | Demo et al. ........................ 228/216 |
| 5,687,465 | * 11/1997 | Hinata et al. ................... 264/102 X |
| 5,767,482 | 6/1998 | Turner ............................ 219/121.71 |
| 5,773,790 | * 6/1998 | Moore et al. ................... 219/121.71 |
| 5,776,222 | * 7/1998 | Kopylov et al. .................... 65/384 |
| 5,902,647 | * 5/1999 | Venkataramani et al. ........... 427/454 |
| 5,914,060 | * 6/1999 | Flis et al. ...................... 219/121.71 |
| 5,928,534 | * 7/1999 | Flis et al. ...................... 219/121.71 |

FOREIGN PATENT DOCUMENTS

| | | | |
|---|---|---|---|
| 2241186 | * 8/1991 | (GB) .............................. 219/121.71 |
| 4-41090 | * 2/1992 | (JP) ................................ 219/121.7 |
| 4-172194 | * 6/1992 | (JP) .............................. 219/121.71 |
| 7-279611 | 1/1996 | (JP) . |

\* cited by examiner

*Primary Examiner*—M. Alexandra Elve
(74) *Attorney, Agent, or Firm*—Gene D. Fleischauer

(57) ABSTRACT

A method and material 52 for blocking a laser beam L during laser machining is disclosed. The material comprises a thermoplastic polymer. Various details are developed which promote filling and removing the blocking material from a component 10. In one detailed embodiment, the thermoplastic polymer is formed of only carbon and hydrogen and forms harmless effluent during burnout of the material.

28 Claims, 6 Drawing Sheets

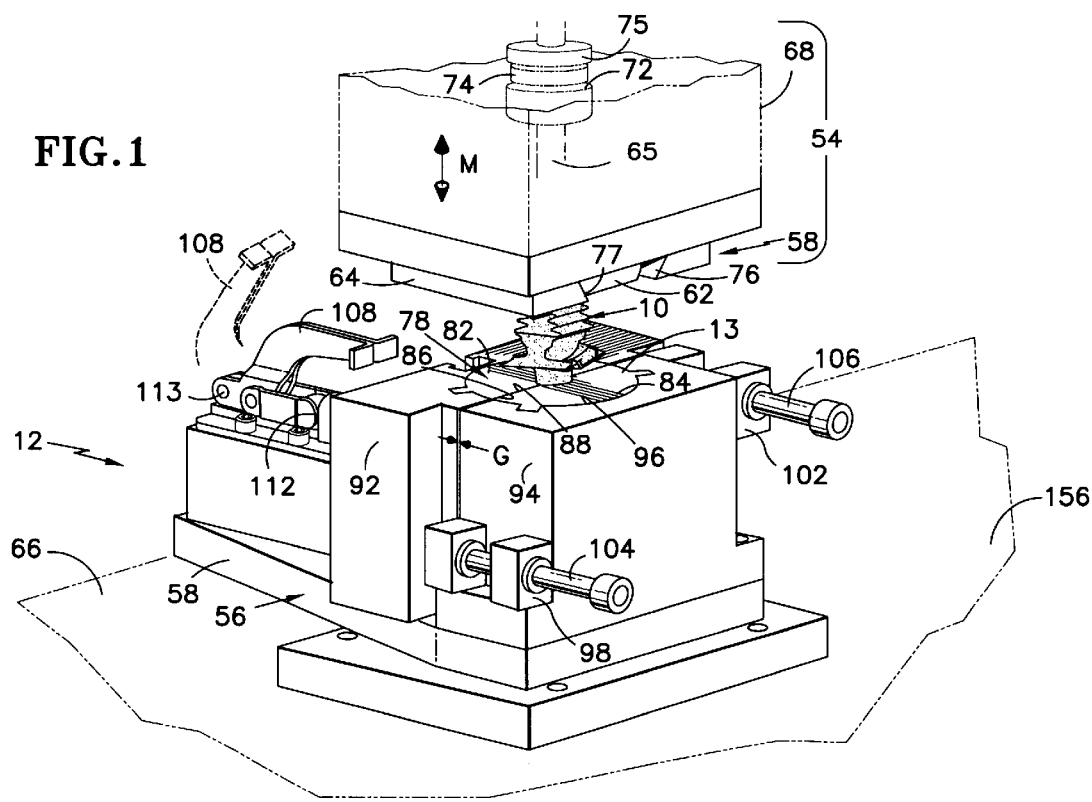
FIG. 1
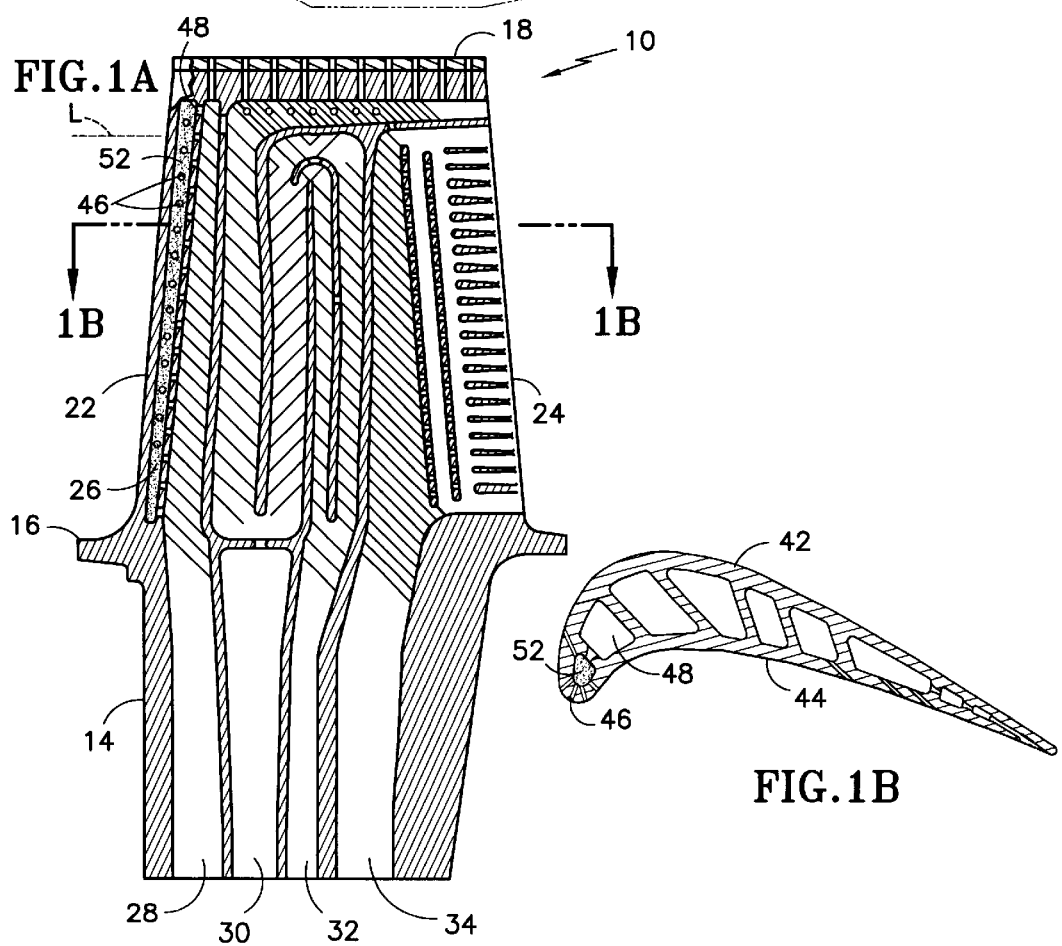
FIG. 1A
FIG. 1B

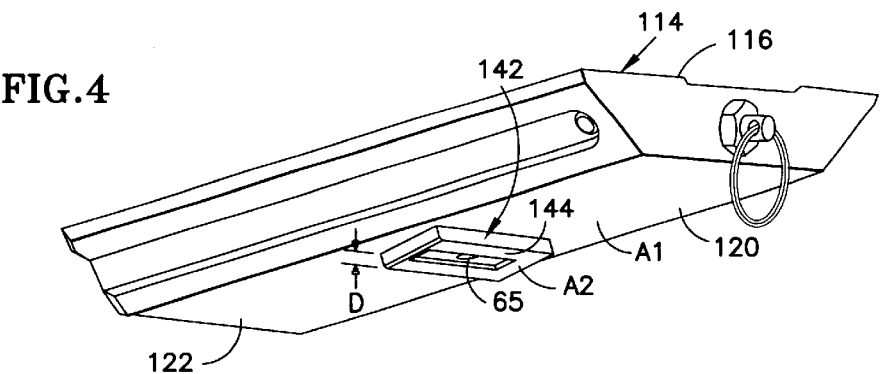
FIG. 4
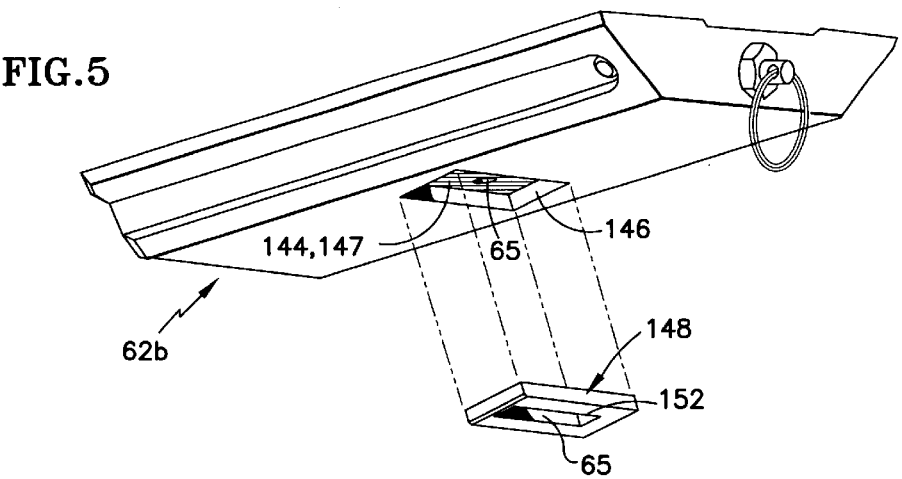
FIG. 5
FIG. 7
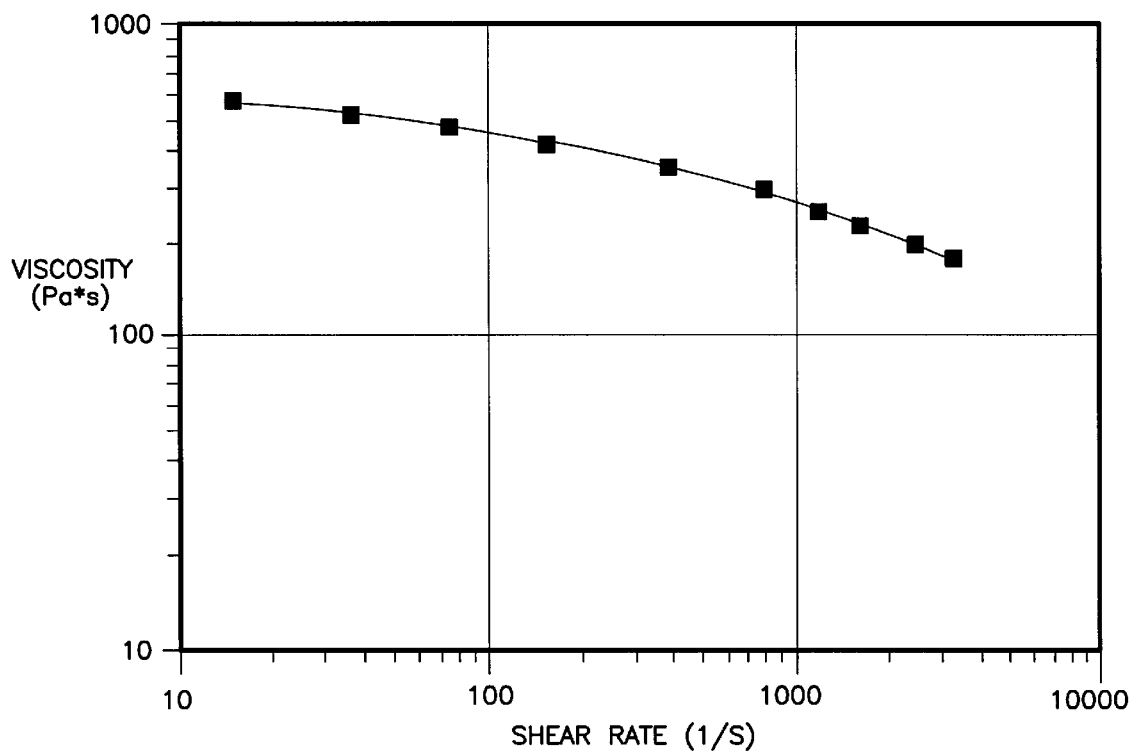

METHOD AND MATERIAL FOR PROCESSING A COMPONENT FOR LASER MACHINING

This application claims benefit from U.S. Provisional Application Ser. No. 60/109,176 filed on Nov. 20, 1998.

CROSS-REFERENCE TO RELATED APPLICATION

This application relates to commonly owned U.S. patent applications: U.S. patent application No. 09/162,832 now U.S. Pat. No. 5,914,060 entitled "Method of Laser Drilling an Airfoil", by Jeffrey D. Flis et al.; U.S. patent application No. 09/162,614 now U.S. Pat. No. 5,928,534 entitled "Method for "Reducing Void Volumes in Cavities for Laser Drilling", by Jeffrey D. Flis et al.; U.S. patent application No. 09/213, 690 now U.S. Pat. No. 6,251,315 B1 entitled "Method for Disposing a Laser Blocking Material on the Interior of an Airfoil", by Gordon M. Reed et al.; U.S. patent application No. 09/213,592 now U.S. Pat. No. 6,224,361 B1 entitled "Tool for Disposing Laser Blocking Material in an Airfoil", by Christopher P. Jordan et al.; U.S. patent application No. 09/213,580 now U.S. Pat. No. 6,177,038 entitled "Method for Orienting an Airfoil for Processing and for Forming a Mask for the Airfoil", by Stanley J. Funk et al.; and U.S. patent application No. 09/213,593 now U.S. Pat. No. 6,139,303 entitled "Fixture for Disposing a Laser Blocking Material in an Airfoil", by Gordon M. Reed et al.

DESCRIPTION

1. Technical Field

This invention relates to a laser blocking material and method for laser machining a component such as an airfoil having internal passages for cooling air. More particularly, the method includes disposing a thermoplastic material in a cavity for blocking a laser beam from striking the interior as a hole is drilled to the cavity through a wall of the component, then drilling the hole and removing the material from the cavity.

2. Background of the Invention

Airfoils for gas turbine engines are disposed in a flow path for working medium gases. Examples of such airfoils are turbine blades and turbine vanes. The airfoils are bathed in hot gases as the gases are flowed through the engine. Cooling air is flowed though passages on the interior of the airfoil under operative conditions to keep the temperature of the airfoil, such as a turbine vane or turbine blade, within acceptable limits.

In addition, the airfoil may have cooling air holes extending from the interior to the exterior of the airfoil. The cooling air holes are small and may have diameters that are in a range of eleven to seventeen mils (0.011–0.017 inches). The holes are drilled in pre-determined patterns and are contoured to ensure adequate cooling of the airfoil.

The cooling air holes duct cooling air from passages on the interior of the airfoil through the hot walls to the exterior. The cooling air provides transpiration cooling as the air passes through the wall and, after the air is discharged from the airfoil, provides film cooling with a film of air on the exterior. The film of cooling air provides a barrier between the airfoil and the hot, working medium gasses.

One way to drill the holes uses a laser to direct a beam of coherent energy at the exterior of the airfoil. The intense radiation from the laser beam burns through the wall of the airfoil, leaving behind a hole which provides a satisfactory conduit for cooling air. As the laser beam penetrates through the airfoil wall into an interior cavity, the laser beam may strike adjacent structure on the other side of the cavity causing unacceptable damage to the airfoil. Accordingly, blocking material may be disposed in the cavity to block the laser beam from striking walls bounding the cavity after the beam penetrates through the airfoil wall.

One approach is to leave disposed within the airfoil the ceramic casting core around which the blade is poured during the manufacturing process. The ceramic core provides a suitable blocking material. The ceramic core is subsequently removed by well known leaching techniques. This approach is described in U.S. Pat. No. 5,222,617 entitled "Drilling Turbine Blades" issued to Gregore, Griffith and Stroud. However, the presence of the core after casting prevents initial inspection of the interior of the airfoil. The ceramic material may also be difficult to remove once the cooling air holes are drilled. In addition, the core is not available for use with the airfoil during repair processes which may require redrilling of the cooling air holes.

Another example of a blocking material is wax or a wax-like material. The material is melted so that it may easily flow into interior passages, such as the leading edge passage of the airfoil. The temperature of the molten material above its melting point, may exceed two hundred and fifty degrees Fahrenheit (250°). The molten material may be poured by hand or injected into the cavity or may even be sprayed or painted on the surface to be protected. However, the molten material may severely scald personnel working with the material. Moreover, the operation is time consuming if such material is poured by hand into the airfoil. In addition, the wax may extend between two closely adjacent cooling air holes. The wax adjacent the first hole, which blocks the laser beam as the second hole is drilled, may melt as the first hole is drilled by the laser beam. This causes a void to form in the wax. As a result, the energy from the laser beam at the second hole may not be sufficiently dissipated by the wax as it passes through the portion of the passage having the void. Damage may occur to the airfoil as the second hole is drilled because the beam, after it penetrates through the wall at the second hole, may strike the interior wall of the airfoil.

One wax-like blocking material which uses an additive to avoid forming voids is discussed in U.S. Pat. No. 5,049,722, issued to Corfe and Stroud, entitled "Laser Barrier Material And Method Of Laser Drilling". In Corfe, a PTFE (polytetrafluoroethylene) wax-like material is disposed in a wax base. The PTFE helps avoid the formation of voids. Disposing such material on the interior of a leading edge passage is particularly difficult for some airfoils. Often the leading edge passage has no connection during fabrication with the exterior of the airfoil. It is a blind or dead end passage prior to the drilling operation except for small impingement holes which place the passage in gas communication with an adjacent passage. The adjacent passage also has an opening for receiving cooling air which is flowed to the leading edge passage. Accordingly, personnel must carefully pour the molten material in the inlet opening and manipulate the airfoil to avoid bubbles in the material in the leading edge passage.

Still another approach is to use a masking agent, such as an epoxy resin, which is disposed in the airfoil in a fluid state. The epoxy resin is disposed in the airfoil by simply pouring the resin into the airfoil. The epoxy resin is at room temperature and poses no scalding hazard to personnel. The epoxy resin is further processed to harden the fluid and cause it to become a more solid material similar to the PTFE wax mentioned in U.S. Pat. No. 5, 049,722. However, the resin is relatively viscous compared to molten wax and has difficulty in flowing through small connecting passages on the interior of the airfoil.

It may be particularly difficult in some airfoils to dispose such material on the interior of a leading edge passage. Often the leading edge passage has no connection during fabrication with the exterior of the airfoil. It is a blind or dead end passage prior to the drilling operation except for small impingement holes which place the passage in gas communication with an adjacent passage. The adjacent passage also has an opening for receiving cooling air which is flowed to the leading edge passage. Accordingly, personnel must carefully pour the molten material in the inlet opening and manipulate the airfoil to avoid bubbles in the material in the leading edge passage and manipulate the airfoil to avoid the formation of voids. The material does have the advantage of being easily removed by heating the material to a temperature that vaporizes the material.

Another approach is to use a thixotropic medium that comprises materials for dispersing laser light. This approach is discussed in U.S. Pat. No. 4,873,414 issued to Ma and Pinder entitled "Laser Drilling of Components". A particular advantage of this medium is that it emits light when contacted by the laser light. Monitoring the light reflected from the component may allow detection of the laser beam as the laser beam breaks through the second surface allowing a feedback control to determine whether or not the laser beam has drilled a through hole. In addition, the viscosity of the medium so that the medium may be decreased by forcing the medium through a nozzle to lower the viscosity of the medium so that the medium flows readily over an inner surface of the component. The thixotropic medium may be removed by contacting the medium with a flushing agent which requires both additional manipulation of the component and the active flowing of additional material into the component.

Another approach is shown in U.S. Pat. No. 5,140,127 entitled "Laser Barrier Material" issued to Stroud and Corse. This approach uses an injectable barrier material which is a composition selected from the group consisting of a first copolymer of tetrafluoroethylene and hexfluoropropylene and a second copolymer having a polytetrafluoroethylene backbone and a least one fluorinated alkoxy side group. The material is poured or injected into the interior of the component. The material is subsequently steamed out of the component after filling and laser drilling the hollow turbine blades. It is likely is possible to remove the material in a more passive fashion such as by heating the material to a very high temperature to vaporize the material. However, the products of such combustion will contain fluorine atoms and may result in forming harmful fluids which must be scrubbed from the products of combustion before releasing the products of combustion into the atmosphere.

Another approach is shown in U.S. Pat. No. 5,767,482 entitled "Laser Barrier Material and Method" issued to Turner. Turner uses finely divided crystalline material such as sodium chloride (salt), or other metal salts which are thermally stable and possess a high melting point. Salt may be introduced into the interior of a component by pouring or by making it a paste with water and injecting it. The salt is removed by washing the component with water.

The above art notwithstanding, scientists and engineers working under the direction of Applicants Assignee have sought to develop materials, methods, and devices for disposing laser blocking material on the interior of airfoils which are suitable for use in mass production operations and are relatively easy to remove without forming noxious fluids or without performing several time consuming operations.

SUMMARY OF INVENTION

This invention is in part predicated on the recognition that certain polymers when used to block laser beams, provide a significant advantage in mass production operations and that certain tooling and fixtures may be used with such material or other materials in mass production operations to speed the filling of components such as airfoils. In addition, certain polymers have an advantageous effect on the magnitude of forces transmitted from the blocking material in small passages to the thin walls of the airfoil which forces result from disposing the material in the airfoil and removing the material from the airfoil. In addition, these materials adapt themselves well to rapid processing during the removal operation of the material by heating the materials to their fairly low melting point to allow the melting material to partially escape and then vaporizing the material at a higher temperature in a way that does not form harmful products of combustion.

According to the present invention, a blocking material for attenuating the intensity of a laser beam during a laser machining operation comprises a thermoplastic polymer formed of only carbon and hydrogen having a Melt Flow Index which is not less than thirty (30) and which is partially crystalline such that the crystallinity is greater than forty percent (40%) to diffuse the beam of radiation from the laser.

According to the present invention, a method of drilling a hole in a component having an interior cavity includes the steps of disposing in the cavity a laser blocking material which comprises a thermoplastic polymer material formed of only carbon and hydrogen having a Melt Flow Index which is not less than thirty (30) and which is partially crystalline.

In accordance with one embodiment of the present invention, the blocking material comprises a polyolefin or a mixture of polyolefins.

In accordance with one detailed embodiment, the blocking material comprises a polyethylene or a polypropylene material.

In accordance one detailed embodiment, the blocking material has a resiliency characteristic such that as the material is expanded during burnout operations, the material deforms under load to relieve its stresses so that all forces of thermal expansion of the material are not transmitted to the component.

In accordance with one embodiment of the present invention, the method includes removing the laser blocking material by heating the material to its melting point and then heating it further to vaporize any remaining blocking material.

In accordance with one embodiment of the present invention, the method includes inspecting holes formed by the laser beam by probing the hole with a sharp instrument and determining that the hole has been drilled through the wall by encountering the resilient blocking material disposed in the hole or on the interior of the component.

In accordance with one embodiment of the present invention, the method includes vaporizing a portion of the blocking material into a plasma that is relatively transparent to the laser beam and passing the laser beam through the plasma to the solid portion of the material having a crystallinity for diffusing the laser beam.

A primary feature of the blocking material is the presence of carbon and hydrogen. Another feature is the crystallinity of the material which is greater than forty percent (40%) and in some embodiments is greater than sixty percent (60%). Another feature of the present invention is the level off transparency of the plasma formed from vaporizing the material with a laser beam so that the plasma does not interfere with the machining operation of the laser. Still another feature is the relatively low melting temperature of the blocking material which ranges from two hundred and fifty degrees Fahrenheit to five hundred and forty degrees Fahrenheit (250° F.–540° F.) but which is typically less than three hundred degrees Fahrenheit (300° F.).

A principal advantage of the present invention is the quality of holes drilled in hollow components. which results from the interaction of the laser beam with the blocking material. Still another advantage is the processing speed and costs which result from the ease of disposing material on the interior of a component because of the shear thinning characteristic and Melt Flow Index and from the ease of removing the material by burnout because, in part, the by products of burning the laser blocking material are harmless carbon dioxide and water vapor. In one embodiment, an advantage is the simplicity of the laser drilling process that results from using a laser blocking material that forms harmless products of combustion (carbon dioxide and water) which do not need special treatment prior to releasing products of combustion into the atmosphere. Still another feature is the rate of solidification of the material which results from its shear thinning characteristic and the absence of shear once the pressure driving the material into the component is removed.

A particular advantage of the present invention is the reduction in scrap and rework during laser machining operations which results from the ability of the laser blocking material to flow into narrow passages on the interior of a component, such as an airfoil, and reflects, in part, the Melt Flow Index and the inherent ability of the material to flow through such passages under pressure. Still another advantage of the present invention is the durability of airfoils which results from the ability of the material to deform as it expands to relieve internal stresses, thus decreasing the forces transmitted to the airfoil. Another advantage is the durability and integrity of the airfoil which results from the relatively low melting temperature of the material which limits the amount of thermal expansion of the material prior to the material turning into molten form. Still another feature is the ease of handling of the component which results from the material remaining in the solid state after the material has been disposed in the component.

The foregoing and other features and advantages of the present invention will become more apparent in light of the following detailed description of the invention and as described and illustrated in the accompanying drawings.

BRIEF DESCRIPTION OF DRAWINGS

FIG. 1 is perspective view in full of a component, such as an airfoil; of a tool for disposing laser blocking material in the component; and, in phantom, of a portion of a source of laser blocking material, such as an injection molding machine.

FIG. 1A is a side elevation, cross sectional view of the airfoil shown in FIG 1.

FIG. 1B is a cross-sectional view of the airfoil shown in FIG. 1A taken along the lines 1B—1B of FIG. 1A.

FIG. 4 is perspective view from below of a sprue plate shown in FIG. 1 and FIG. 3.

FIG. 5 is a perspective view from below of an alternate embodiment of the sprue plate shown in FIG. 4 having a recess for a seal, and showing in exploded fashion, a seal member which fits in the recess.

FIG. 7 is a graphical representation of the shear thinning characteristic for a linear polyethylene polymer and shows viscosity in Pascal seconds as a function of shear rate in reciprocal seconds.

DETAILED DESCRIPTION OF THE INVENTION

Figure 2:
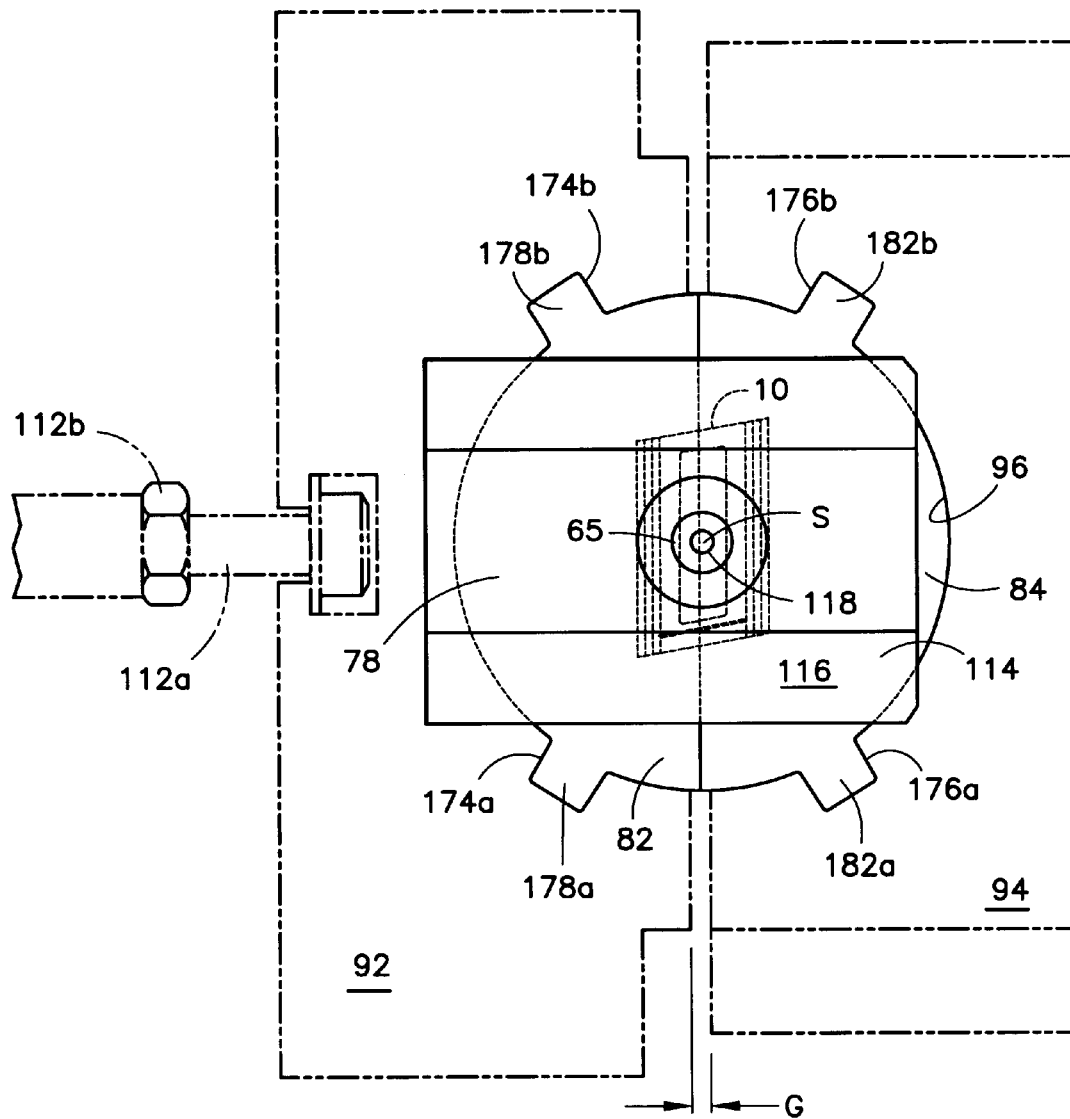
FIG. 2 is a view from above of FIG. 1 with portions of the tool and injection molding machine either broken away for clarity or shown in phantom.

FIG. 1 is a partial perspective view of a component, as represented by an airfoil 10 for a gas turbine engine. FIG. 1 also shows a tool 12 for disposing a laser blocking material on the interior of the component. The tool has a cavity 13 in which airfoils are disposed repetitively as, one after another, the airfoils are filled. Although the airfoil shown is a rotor blade the term "airfoil" includes other components having flow directing surfaces such as stator vanes.

FIG. 1 A is a side elevation cross sectional view of the rotor blade 10 during manufacture. The rotor blade has a first end, as represented by the root 14, a platform 16, and a second end, as represented by the tip 18. The airfoil has an aerodynamic leading edge 22 which extends spanwise. An aerodynamic trailing edge 24 is spaced chordwise from the aerodynamic leading edge. The airfoil has a plurality of cavities or passages for cooling air as represented by the leading edge passage 26 and passages 28, 30, 32, 34 which extend through the root of the rotor blade. The passages 28, 30, 32, and 34 extend into the interior of the rotor blade and often extend in serpentine fashion as represented by the passage 32.

FIG. 1 B is a cross sectional view taken chordwise along the line 1B—1B of FIG. 1A. The airfoil has flow directing surfaces, as represented by the suction surface side or sidewall 42 and the pressure surface side or sidewall 44. Each of these surfaces extend rearwardly from the leading edge to the trailing edge and extend spanwise between the platform 16 and the tip 18.

A plurality of internal impingement holes, as represented by the hole 48, connect the leading edge passage 26 in the leading edge region with the supply passage 28 for cooling air. The impingement holes are of small size and have a hydraulic diameter that is typically less than forty (40) mils (that is, $D_h = 4Ai/P = 0.040$ inches, where A is the area of the hole and P is the perimeter of the hole). In some applications, the holes may have a hydraulic diameter that is less than thirty (30) mils. A plurality of film cooling holes adjacent the leading edge 22, as represented by the holes 46, extend from the impingement passage 26 in the leading edge region to the exterior of the rotor blade.

As shown in FIG. 1B, one way of forming the film cooling hole 46 is to drill the hole with a laser beam, as represented by the laser beam L, from the exterior of the airfoil to the leading edge passage 26. As shown in FIG. 1B and in schematic fashion in FIG. 1A, a laser blocking material 52 is disposed in the leading edge passage on a portion of the component for attenuating the intensity of the laser beam. The laser blocking material ensures that the laser beam does not injure structure that faces the cooling air hole as the laser beam breaks through the wall of the rotor blade during the drilling process.

As shown in FIG. 1, means for supplying the blocking material under pressure, as represented by part of an injection-molding machine 54, is in flow communication with the tool 12. Alternate equivalent machines include any machine capable of being a source of pressurized laser blocking material to the airfoil such as transfer molding machines and plastic extrusion machines.

The tool 12 includes a fixture 56 for engaging the rotor blade and filling the rotor blade with laser blocking material. The term "filling" means to dispose or supply the material and includes partially filling or completely filling the blade. The fixture includes a base 58, sprue plate 62 and sprue plate holder 64. A passage 65 for supplying the laser blocking material extends through the sprue plate and sprue plate holder.

Figure 3:
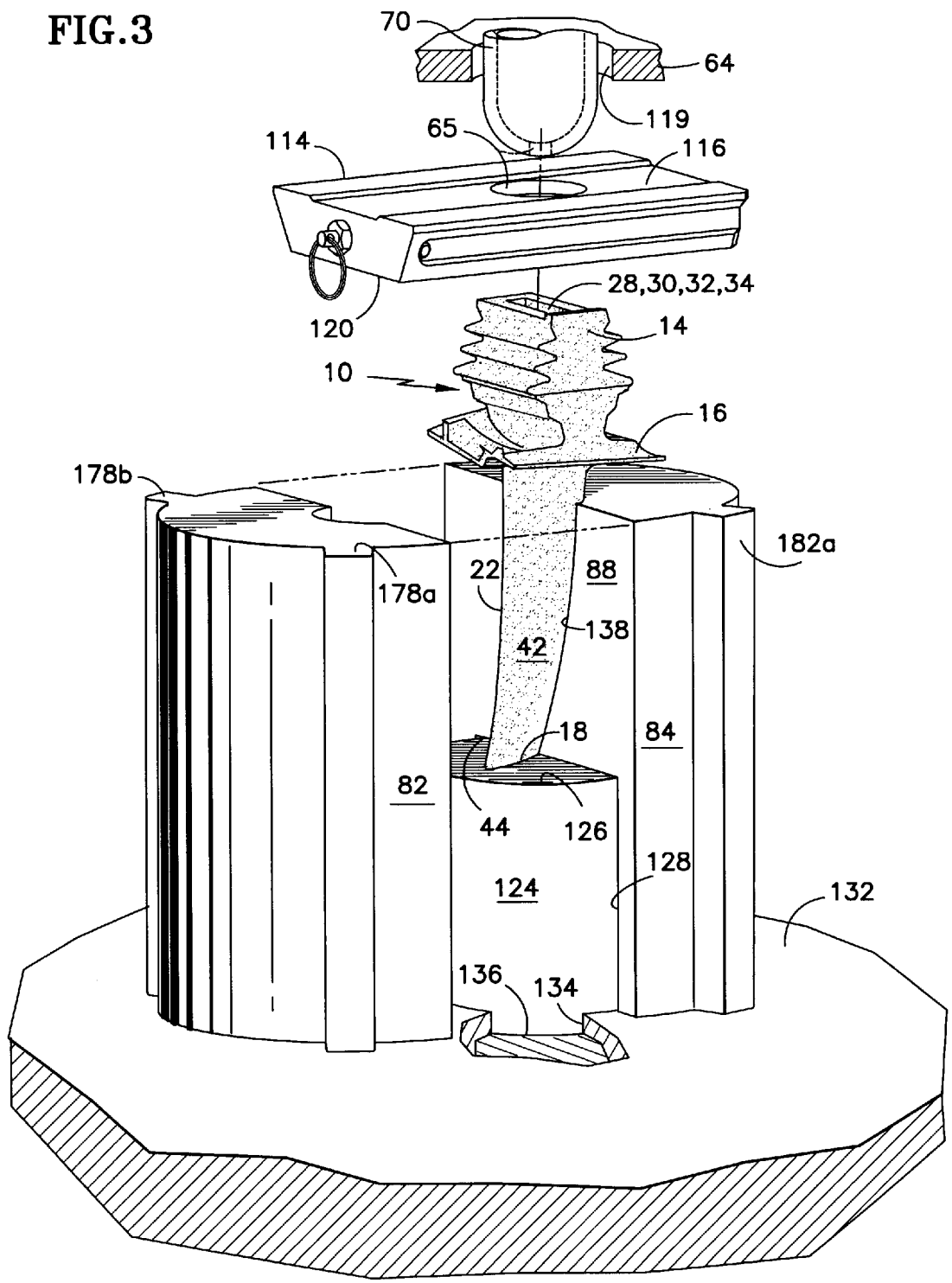
FIG. 3 is an exploded view of part of a nozzle for the injection molding machine and part of the tool shown in FIG. 1, which has a pair of mask is members.
Figure 3A:
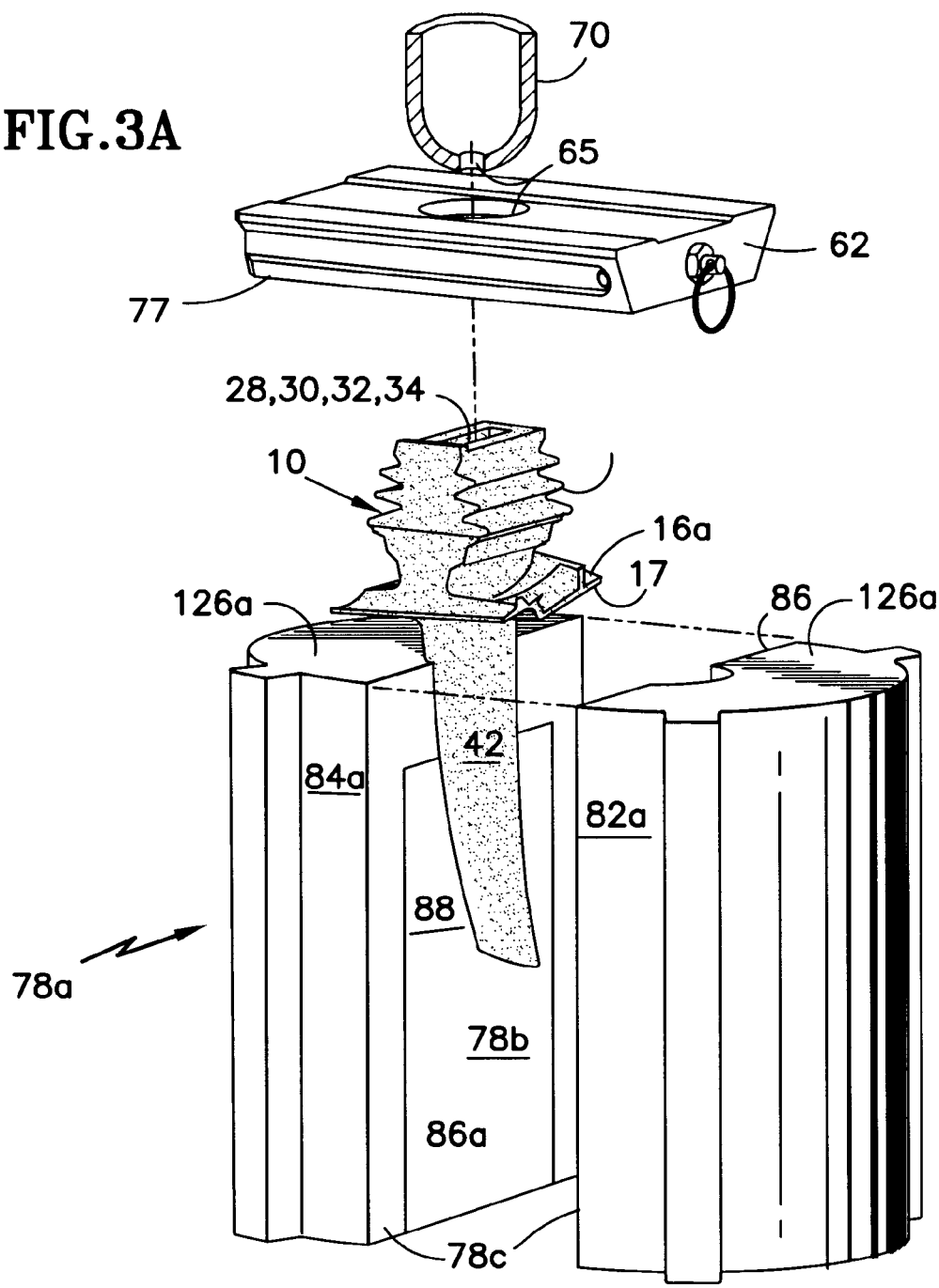
FIG. 3A is alternate embodiment of a portion of the tool shown in FIG. 3A showing mask members formed in part of fairly rigid material which engages the platform of the airfoil shown in FIG. 3.

The injection molding machine has a table 66 for receiving the tool and a housing 68 that has a nozzle 70 as shown in FIG. 3 and FIG. 3A. The housing is movable in the direction M with respect to the tool 12 and can exert a predetermined force on the tool and on the rotor blade. The housing has a chamber 72 for receiving a charge 74 of laser blocking material 52 (shown in schematic fashion). The volume of the charge is slightly larger than the internal volume of the interior of the airfoil which is receiving the laser blocking material.

The chamber 72 receives the laser blocking material from a passage (not shown) which has disposed therein screw means (not shown) for forcing the laser blocking material into the chamber. A piston 75 is disposed in the chamber for driving the laser blocking material in passage 65 through the housing to the sprue plate. One satisfactory machine for this purpose is the Model 70 Injection Molding Machine available from the Mini-Jector Machinery Corp., Newbury, Ohio. Another machine which has proven satisfactory is the Toyo Plastar TI-90G2 injection molding machine available from the Hitachi Group through Toyo of America, 16 Chapin, Pinebrook N.J. 07053.

As shown in FIG. 1, the sprue plate holder 64 of the tool 12 is integrally joined, such as by bolts (not shown), to the housing 68 of the injection molding machine 54. The sprue plate holder has a dove tail slot 76. The sprue plate 62 slidably engages the sprue plate holder through the dovetail slot and has tapered edges 77 which cooperate with the dovetail slot to retain the sprue plate. The sprue plate has part of the passage 65 for receiving the laser blocking material. The passage places the chamber 72 of the injection molding machine in flow communication with the passages 28, 30, 32, 34 which extend through the root 14 of the turbine blade 10.

The table is adjustable with respect to the housing 68 of the injection molding machine 54. The tool base 58 is located in predetermined fashion with respect to the table 66. The base is adapted by locating dowels or locating pins (not shown) for this purpose to precisely engage the table at the same location each time that the fixture is installed on the table. Accordingly, the tool base is adjustable through the table with respect to the housing.

The tool includes a mask 78. The mask has a pair of mask members, as represented by the first mask member 82 and the second mask member 84. The mask members each have a surface, as represented by the first surface 86 of the first mask member and the second surface 88 of the second mask member. The surfaces each conform to the exterior of the airfoil. The mask members are formed of elastomeric material such as room temperature vulcanized (RTV) rubber. One satisfactory elastomer is material is RTV 668 Elastomeric material available from the General Electric Company, Waterford, N.Y.

The tool further includes a pair of opposed jaws as represented by the first jaw 92 and the second jaw 94. Each jaw engages an associated mask member 82, 84 for urging the mask member into a faying relationship with the airfoil 10. For example, the second jaw 94 engages the second mask member 84. Because the second jaw is fixed to the base of the tool, the second jaw provides a reference surface 96 with respect to both the housing 68 and to the second mask member 84. The housing positions the sprue plate. Accordingly, the second jaw with its chordwise facing reference surface provides, in combination with the sprue plate and the sprue plate holder, a precise way of aligning the rotor blade with the injection molding machine during the filling operation.

The jaws 92, 94 are capable of relative movement with respect to each other. As shown by the phantom lines in FIG. 1, the first jaw is movable with respect to the second jaw from the closed position shown in full to an open position shown in phantom. The second jaw 94 has a pair of guides for such movement disposed on each side of the jaw, as represented by the guides 98 and the guides 102. The first jaw 92 has a first guide rail 104 which slidably engages the first pair of guides 98. The first jaw has a second guide rail 106 which slidably engages the second pair of guides 102. Alternatively, such relative movement might be accomplished by moving both jaws. As mentioned above, the second jaw provides the reference surface 96 for locating the mask 78 with respect to the housing of the injection molding machine. This feature might be replicated provided the second jaw returns precisely to its closed position.

The tool includes means for moving the jaws from the open position to the closed position, as represented by the arm 108 and lever 112 mechanism shown in FIG. 1. The arm is pivoted about a pivot point 113. As the arm pivots to the open, moved position, the lever pulls the first jaw 92 and the first mask member 82 away from the rotor blade 10 enabling the operator to rapidly remove or insert a rotor blade into the second masking member 84. Other devices for the means for moving the jaw might be actuated by electrical, pneumatic, or hydraulic arrangements or mechanical actuators such as chains, pulleys, or springs.

FIG. 2 is a view from above of FIG. 1 with portions of the tool 12 and the injection molding machine broken 54 away for clarity. FIG. 2 shows the relationship of the rotor blade 10 to the sprue plate 62 and to the passage 65 extending spanwise through the sprue plate. The passage adapts the sprue plate to receive the pressurized blocking material from the nozzle 70 of the injection molding machine. The sprue plate has a first side 114 having a first spanwise facing surface 116. The surface 116 faces spanwise away from the rotor blade in the operative condition in a first direction along a spanwise axis S. As shown in FIG. 2, the spanwise axis S is the stacking line of the chordwise sections of the rotor blade. The first surface 116 adapts the sprue plate to engage the nozzle (shown in FIG. 3) and form a seal about the passage 65 for receiving the pressurized blocking material.

The passage 65 has a narrow portion 118 for discharging the pressurized blocking material into the rotor blade 10. The narrow portion of the passage is in flow communication with the opening formed by the passages 28, 30, 32, 34 in the root of the rotor blade. These passages adapt the root to receive the laser blocking material from the injection molding machine.

The first jaw 92 of the tool 12 is shown in phantom. The lever 112 has an end portion 112a (shown in phantom) which engages the first jaw. The lever has an adjustable link 112b which allows for adjustment of the length of the lever. The second jaw 94 (shown in phantom) is spaced from the first jaw by a small gap G in the operative closed condition. This gap is typically small and in one embodiment is less than twenty five to thirty mils (0.025–0.030 inches).

FIG. 3 is an exploded view, partially broken away, showing part of the tool 12 and part of the nozzle 70 of the injection molding machine 54. The tool includes the fixture 56. The fixture includes the tool base 58, the sprue plate 62, and the sprue plate holder 64. The sprue plate holder has an opening 119. The nozzle 70 extends through the opening 119 to engage the sprue plate 62. The nozzle is pressed against the first surface 116 of the first side 114 by bolts (not shown) which urge the nozzle and sprue plate together. The sprue plate 62 has a second side 120 having a second spanwise facing surface 122.

The fixture 56 also includes a member, as represented by a block 124 (locating block), which is spaced spanwise from the sprue plate. The locating block 124 has a first reference surface 126 which faces in the spanwise direction and which engages the tip 18 of the airfoil 10 in the operative condition. The locating block is formed of a material that is softer than the tip of the airfoil to avoid damaging the tip of the airfoil. The second mask member is adapted by a first opening 128 to receive the block of material. As shown, the locating block is nested (put snugly inside) the second mask member 84 and helps the second jaw locate the second mask member.

The tool base 58 has a surface 132. The first mask member 82 and second mask member 84 rest on the surface 132. The tool base has a locating hole 134 and a base reference surface 136 bounding the bottom of the hole for positioning the locating block 124. The locating block is disposed in the circular hole in the tool base to precisely locate the block of material with respect to the tool base of the fixture. In an alternate embodiment, the tool base might be the member having the first reference surface 126 for engaging the tip of the airfoil and would use the base reference surface 136 for this purpose.

The second mask member 128 has a second opening 138 which conforms to an aerodynamic edge of the airfoil, such as the leading edge 22 of the airfoil. The second mask member overlaps the leading edge of the airfoil on both the suction side 42 and the pressure side 44 of the airfoil. This engagement aids the mask in supporting and positioning the airfoil as the mask members are moved relative one to the other and moved into engagement with the airfoil. In an alternate embodiment, the mask might overlap both edges or only the trailing edge 24 of the airfoil.

FIG. 3A is an alternate embodiment of the fixture shown in FIG. 3 having a mask 78a. The mask 78a has a first mask member 82a and a second mask member 84a. The mask 78a may be formed with a pliant material at the faying surfaces of the airfoil, such as a liner 78b, in combination with a reasonably rigid support 78c of material of the type used for the locating block 124. Each mask member has a portion of the first reference surface 126a that engages a spanwise facing surface 17 on the airfoil. As shown, the spanwise facing surface 17 is on the platform 16a of the airfoil. The surface is similar to the spanwise facing surface of the second end or tip 18 of the airfoil in that the surface 16a is adapted to engage the first reference 126a of locating block 124 to position the airfoil in the spanwise direction.

FIG. 4 is a perspective view from below of the sprue plate 62. The second spanwise facing surface 122 has an area A1. The second surface faces spanwise toward the rotor blade in the operative condition. The second side 120 has a projection 142 which extends in the spanwise direction a distance D which is about sixty (60) mils. The projection extends around the passage 65 to provide a bounded perimeter about the passage. The projection further has a third surface 144 that provides another (second) reference surface that faces in the spanwise direction for engaging the airfoil. The third surface (second spanwise facing reference surface) has a spanwise facing area A2 which is less than the area A1 (A2<A1).

The area A2 provides a sealing area or seal surface to the sprue plate. The third surface 144 having the area A2 (second spanwise facing reference surface) has a surface finish corresponding to a smooth machine finish with a surface roughness Ra measurement of about sixty three (63) micro inches as measured in accordance with the procedures set forth in specification "ANSI B46.1—1985 Surface Texture" available from the American National Standards Institute showing measurements as an average from the mean. The rotor blade has a surface having a finish corresponding to a fine machine finish with a surface roughness finish Ra of about one hundred and twenty five (125) micro inches.

The sprue plate holder 64 is integrally attached to the injection machine such as by fastening means or bonding. The sprue plate 62 is fixed to the sprue plate holder by a set screw or other device for fixing the holder to the plate. In the embodiment shown, fastening means (not shown) urge the sprue plate holder 64 toward the housing 68 of the injection molding machine 54 and the sprue plate holder urges the sprue plate upwardly against the nozzle 70. In the operative condition, the sprue plate and the nozzle 70 of the injection machine are pressed together tight enough to form a seal to block the loss of laser blocking material from the passage 65. The housing of the injection machine pushes downwardly on the sprue plate holder 62 with a force F of about one hundred pounds (100 lbf). This pushes the other side of the sprue plate against the airfoil to form a seal (at the interface between the reduced area A1 and the root of the airfoil). The force F is transmitted through the airfoil and presses the airfoil tip (second end) against the block 124, trapping the airfoil spanwise between the block and the sprue plate.

In an alternate embodiment, the nozzle might press against the sprue plate and that force would urge the sprue plate against the root 14 (second end) of the airfoil. Again, this forms a seal between the sprue plate and the airfoil at the second spanwise facing reference surface 144 of the sprue plate and the root.

As mentioned, the locating block surface 126 (first reference surface) is softer than the tip of the rotor blade so that the tip 18 of the rotor blade is not injured as the injection molding machine presses the airfoil against the block. Under operative conditions, the pressurized material exits the nozzle at a pressure of about sixteen hundred pounds per square inch (1600 psi) and a temperature of about three hundred degrees Fahrenheit (300° F.).

FIG. 5 is an alternate embodiment 62b of the sprue plate 62 shown in FIG. 4. The sprue plate 62b is formed of a hardened two part epoxy available from the Ciba-Geigy Corporation., 4917 Dawn Avenue, East Lansing, Mich. 48823-5691. The material is supplied as R4036 resin with an R1500 hardener. This is one example of a suitable material for the locating block 124.

The sprue plate 62b shown in FIG. 5 has a recess 146 for receiving the root 14 of the rotor blade. The recess has a seal surface 147 which adapts the sprue plate 62b to receive a polytetrafluoroethylene seal. The polytetrafluoroethylene seal is urged tightly against the sprue plate and against the rotor blade by the injection molding machine. The polytetrafluoroethylene seal has an opening 152 for passing the laser blocking material along the passage 65 from the sprue plate to the rotor blade. In one embodiment, the seal is about three fourths of inch long and one-half of an inch wide with an opening suitable for flowing the blocking material into the root of the airfoil. One satisfactory material for the seal is mechanical grade Teflon® material which has a very small tendency to cold flow. This material is provided in sheet form by Interplast, Inc., One Connecticut Drive, Burlington, N.J. 08016-4101. Interplast is a processor of Dupont Teflon® material.

Figure 6:
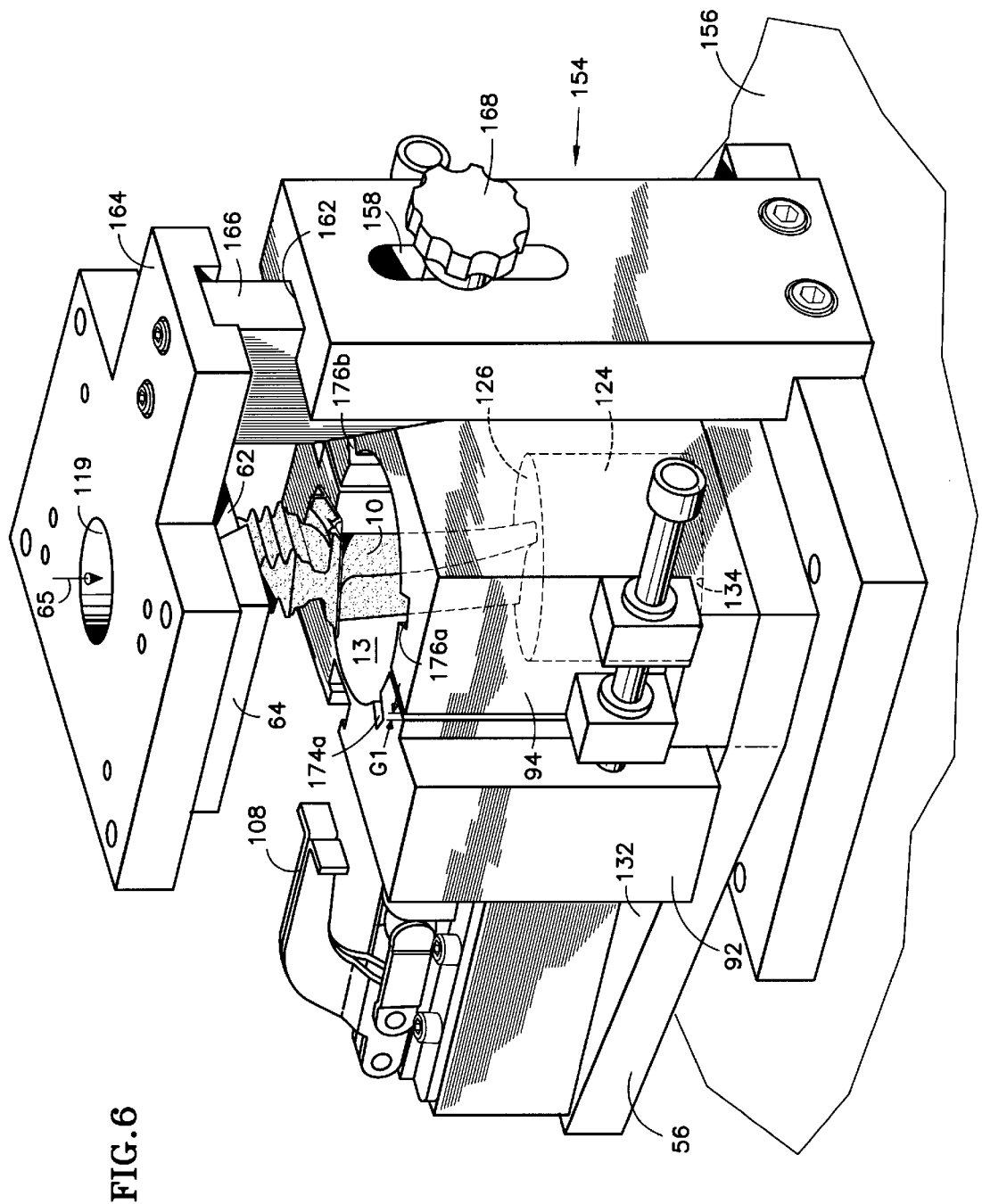
FIG. 6 is a perspective view of the tool shown in FIG. 1 installed on an apparatus for orienting the airfoil with respect to a source of laser blocking material and shows a sprue plate and a sprue plate holder which has been modified slightly to engage the apparatus.

The fixture 56 may be used in the process for orienting airfoil 10 with respect to any machine for injecting laser blocking material, such as the injection molding machine 54. One method for orienting a new airfoil with respect to the injection machine so that like airfoils may be repetitively filled using the tool 12. The first step is to remove the tool 12 from the machine and to install the tool in an apparatus 154 as shown in FIG. 6. The apparatus has a table 156, similar to the table 66 shown for the injection molding machine. The table has locating pins (not shown) which locate the tool in a predetermined relationship to the table. The base of the tool has the locating hole 134 for positioning the locating block 124. The locating block engages the tip of the airfoil with the first reference surface. The combination of the tool 12 and table 158 locate the locating block in a known position with respect to the apparatus so that the tip 18 (second end) of the airfoil is positioned with respect to the apparatus. Airfoils of different length are easily accommodated in the fixture changing the block to a block having a suitable height.

The apparatus has a vertical member 154 having a groove 158. The apparatus has a laterally extending plate 164. The plate has a vertical support 164 which slidably engages the groove. The plate is integrally attached to the vertical support and is adjustable with respect to the vertical member by means of a locking clamp 166. In the embodiment shown, the apparatus plate is adapted to engage the sprue plate holder 64 to locate the sprue plate holder and sprue plate 62 precisely in the spanwise direction with respect to the first reference surface 126 of the locating block and with the same relationship to the first reference surface in the spanwise direction as in the operative condition.

A device, such as a sprue plate element, simulating the sprue plate 62 might be used in place of the sprue plate as long as the device provides the correct orientation of the root (first end)14 of the airfoil to the first reference surface. The sprue plate element and the sprue plate are each represented by the sprue plate 62 shown in FIG. 6. The advantage of using the sprue plate and the sprue plate holder or a device simulating the sprue plate holder is that it reproduces the engagement of sprue plate in the operative condition to the airfoil and to the other parts of the tool.

The method for orienting the airfoil 10 with respect to the injection molding machine 54 includes forming the fixture so that it has the cavity 13. The cavity adapts the fixture to receive the elastomeric mask members 82, 84 of the mask 78 for engaging the airfoil in the operative condition.

The method includes forming the mask 78 for engaging the airfoil. This includes the steps of forming a core having an airfoil portion which is dimensionally equivalent to the airfoil which is to be filled, at least over that region of the core which engages the mask. Alternatively, an actual airfoil might be used for the core. After disposing the core in the cavity, the plate 164 of the apparatus and the sprue plate 114 are adjusted to orient the sprue plate with respect to the airfoil, to the fixed second jaw 94, and to the first reference surface 126 on the locating block 124. This method includes trapping the core between the sprue plate and the first reference surface such that the orientation of the core to the sprue plate and the core to the first reference surface is the same as in the operative condition.

The method includes disposing a masking material in fluid form in the cavity 13 and allowing the material to harden. One satisfactory material is an elastomeric material such as room temperature, vulcanized material available as R668 from the General Electric Company.

As shown in FIG. 2, the first jaw 92 and the second jaw 94 each have a pair of spanwise extending grooves as represented by the grooves 174a, 174b and the grooves 176a, 176b. The masking material flows into these grooves. This material hardens to form strips on the mask. The strips are represented by the strips 178a, 178b which engage the grooves 174a, 174b of the first jaw and the strips 182a, 182b which engage the grooves 176a, 176b of the second jaw. The strips extend in the grooves and engage the jaws in a chordwise direction substantially perpendicular to the surfaces of the jaws.

After the material hardens, the step of forming the mask 78 includes cutting the masking material in a generally spanwise direction to form a single parting line if a one piece mask is desired or two parting lines if a two-piece mask is desired. The parting line enables removal of the core and insertion of the airfoil in the operative condition.

In the embodiment shown in FIG. 6, two parting lines are made on either side of the airfoil to divide the masking member into the pair of mask members 82, 84. In alternate embodiments, it might be desirable to have more than a pair of mask members. The mask members are cut such that each parting line extends between the cooling air holes of the finally manufactured airfoil. This enables the mask to block the flow of blocking material out of the holes 46 of the airfoil to such an extent that the material does not flow to locating surfaces on the airfoil for the laser drilling operation. This is important in those cases where a repaired airfoil is being redrilled or a newly manufactured airfoil is being reworked and the airfoil already has some cooling holes 46 formed in the surface of the airfoil.

The jaws 92, 94 of the tool are movable relative to each other. The method of orienting the airfoil by forming the mask includes spacing the jaws one from the other by the gap G in the closed position. (The gap G is the distance that the jaws are spaced in the operative condition.) A layer of molding material is disposed between the jaws to fill the gap G. The molding material seals the mold against the loss of masking material in fluid form. One satisfactory material is beeswax. Alternatively, the jaws might be spaced apart by a gap G1 which is greater than the gap G. This might be achieved during the step of forming the mask by not fully closing the jaws. This results in the lateral length of the mask being slightly greater than the lateral width of the cavity in the operative condition. The jaws under operative conditions will then exert a predetermined level of force on the masking member. The same effect might be achieved by adjusting the length of the lever which moves the jaw. This might be done by employing an adjustable link 112b so that the jaws move to the fully closed position with a gap G in the operative condition but are adjusted so that the jaws are spaced apart by the gap G1. One satisfactory gap G1 was set at about one eighth of an inch (125 mils). The gap G1 for the is tool in the closed position in one embodiment was about four times of the gap G for the tool in the operative condition.

A particular advantage of the tool 12 is the second jaw 94 which does not move. That jaw and the second chordwise facing reference surface 96 have a predetermined relationship with respect to the locating hole 134 because both are fixed. The locating hole positions, in turn, the locating block 124 having the first reference surface 126. These known relationships cause the mask 78 and its mask members 82, 84 which engage the jaw to have a known relationship with respect to the airfoil (which engages the first reference surface) and the airfoil to the reference surface on the second jaw 96; and, the airfoil and the mask to the sprue plate 62 through the second jaw and the base of the fixture and thence through the table of the apparatus to the housing 62. A small lateral adjustment might be required, for example, in the operative condition, depending on the size of gap G1 as compared to the gap G, to ensure that these components have the correct relationship in the operative condition. Thus, this relationship in the apparatus from making the mask is the same or very easily adjustable to the same relationship as in the operative condition.

Certain thermoplastic polymers have characteristics which aid in disposing the laser blocking material 52 on the interior of the rotor blade 12 and in attenuating the intensity of the laser beam. These characteristics provide advantages during filling and drilling of the airfoil with a laser and advantages later as the blocking material is removed from the airfoil. For example, the laser blocking material comprises a thermoplastic polymer formed of only carbon and hydrogen. The thermoplastic polymer creates harmless products on complete combustion of the material during burnout of the material. The polymer also has a Melt Flow Index which is greater than about fifty (50) which promotes flow. The thermoplastic polymer is partially amorphous; but it is also partially crystalline such that the crystallinity is greater than forty percent (40%) to diffuse the beam of radiation from the laser.

Experiments have been performed using members of the polyolefin family. The term "upolyolefin" and the particular forms of the polyolefins such as "polypropylene", "upolyethylene", etc. include their copolymers and homopolymers. For example, these include linear low density polyethylene (LLDPE), low density polyethylene (LDPE), high density polyethylene (HDPE), polypropylene (PP).

One satisfactory material is a linear, low-density polyethylene available as Dowlex 2503 from the General Polymer Division of Ashland Chemical Company and is manufactured by the Dow Chemical Company, Midland, Mich. 48674. This polyethylene has a specific gravity of nine hundred and thirty seven thousandths (0.9370) at twenty three degrees Celsius (23° C.) and a Melt Flow Index of one hundred and five (105) using the standard of measurement set forth in ASTM D-1238-82 entitled "Flow Rates of Thermoplastics by Extrusion Plastometer". Melt Flow Index is determined for this polyethylene by flowing a number of grams of the polymer during a ten minute period through a known orifice at a temperature of one hundred and ninety degrees Celsius (190° C.) and under a load of about two and sixteen hundredths Kilograms (2.16 kg) which correspond to condition E of the ASTM standard. This polyethylene has an elongation at break of seventy five and two tenths percent (75.2%), a flexural modulus of seventy five thousand five hundred pounds per square inch (75500 psi), a tensile strength at break of eleven hundred pounds per square inch (1100 psi) and a tensile strength at yield of two thousand and ten pounds per square inch (2010 psi). The notched Izod impact strength is forty five hundredths (0.45) at sixty eight point two degrees Fahrenheit (68.2° F.) at one-hundred and twenty five thousandths 0.1250 inches (ft-lbs./in). The tensile impact strength is sixty two and four tenths (62.40 ft-lb./per square inch) at seventy three and two tenths degrees Fahrenheit (73.2° F.). The brittle temperature is thirty six degrees Fahrenheit (36° F.) and the Vicat Softening temperature is two hundred and twelve degrees Fahrenheit (212° F.). It is a copolymer of ethylene and Octene-1.

At temperatures over five hundred and seventy two degree Fahrenheit or three hundred degrees Celsius (572° F. or 300° C.) the material will release highly combustible gases. The specific gravity is less than one and may be even less than ninety five hundredths because it lies in a range of about eighty four hundredths to ninety seven hundredths (0.84 to 0.97) showing the absence of fillers. It has a fairly high molecular weight which is greater than one thousand (1000) and is formed of only carbon and hydrogen.

Polyolefins such as polypropylene, polyethylene, polybutylene, polyisoprene have the advantage of shear thinning coupled with their relatively good Melt Flow Index. The Melt Flow Index is measured at low shear conditions. As shearing of the polyethylene increases, the viscosity of the material precipitously decreases and may decrease as much as fifty percent (50%)or even greater amounts.

An advantage of using the injection molding machine for injecting the laser blocking material is that the machine itself and through the pressure it exerts, causes shear thinning of the polyethylene prior to the polyethylene reaching the chamber 12, causes shear thinning as it passes through the nozzle 70 and causes shear thinning, if required, in the internal passages of the airfoil 10.

Like Melt Flow index, the shear thinning characteristic is an empirically defined parameter, critically influenced by the physical properties and molecular structure of the polymer and the conditions of measurement. It is determined by using a capillary rheometer but the parameter is not commonly available for materials at all temperatures and pressures because scientists and engineers have not focused on the criticality of the parameter, for example, for filling components having very narrow passages.

FIG. 7 is a graphical representation of the shear thinning characteristic for Dowlex 2503 polyethylene material as determined over a range of shear rates at a temperature of three hundred and seventy-five degrees Fahrenheit (375° F.) by Applicant's Assignee. ASTM D3835, Capillary Rheometer Test was used.

As shown in FIG. 7, the viscosity decreases precipitously from an initial value of about five hundred Pascal seconds (500 Pa s) at a shear rate of twenty per second to a value of less than two hundred Pascal seconds (200 Pa s) at a shear rate of two thousand per second (2000/sec). This represents a decrease of more than fifty percent (50%) from a molasses like liquid at the lower shear rate to a water like liquid as the material flows through the airfoil at shear rates much smaller than the shear rate of two-thousand per second (2000/sec).

As the material is flowed from small passages in the airfoil to large passages in the airfoil, the viscosity will increase as the polymer chains experience a smaller shear rate. However, as the polymer flows through the next smaller cross-sectional area, such as at the trailing edge, the material will once again shear thin because of the increased shear rate. The material will experience a decrease in viscosity and then will more easily flow through th smaller area. As the material flows out of the airfoil, the pressure on the material and temperatures of the material rapidly decreases, causing the material to experience a precipitous increase in viscosity and not flow to locating surfaces on the airfoil.

Accordingly, shear thinning is very helpful in filling modern airfoils with laser blocking material 52. Typically, the volume of the charge 74 of material injected into the airfoil is about five to ten percent (5% to 10%) greater than the internal volume of the airfoil to be filled to ensure complete filling of that volume. This volume of material must be forced into the airfoil, forced through the airfoil, and, to some extent, forced out of the airfoil to ensure complete filling of the airfoil. And yet, the material must have sufficient viscosity such that the material does run through the airfoil to unwanted locations on the airfoil surface. As mentioned, it must solidify in place fairly rapidly after injection as it flows into, through and out of the airfoil.

During the filling operation of the airfoil 10, for example, the thermoplastic polymer is forced into the blade at an extrusion pressure greater than about fifteen hundred pounds per square inch (1500 psi) and at a temperature at about or greater than three hundred degrees Fahrenheit (300° F.). There is a decrease in viscosity due to temperature. The temperatures of the material are expected to range between two hundred and fifty and five hundred and forty degrees Fahrenheit (250° F.–540° F.) for most materials in the polyolefin family. This allows the material to flow with low viscosity through the airfoil with the temperature causing a decrease in viscosity and the shear thinning causing a further decrease in viscosity.

In one application using the Dowlex 2503 material, the polyethylene was extruded at a pressure of sixteen hundred pounds per square inch (1600 psi) into an airfoil having passages and orifices having a hydraulic diameter which was less than forty (40) mils. In some applications, the passages may have a hydraulic diameter which is less than thirty (30) and even less than twenty five (25) mils. It is expected that as the polyethylene is flowed through the airfoil passages, further shear thinning takes place in the especially restricted regions of the airfoil such as the leading edge or the trailing edge region of the airfoil. In these regions, pedestals and small diameter holes retard movement of the material into cavities into which holes extending to the surface are drilled. Nevertheless, these airfoils were successfully filled, in part, because of the shear thinning characteristic of the laser blocking material in the airfoil. In other trials, the material was injected at a pressure of about two thousand pounds per square inch (2000 psi) with a temperature of the material that was less than five hundred and forty degrees Fahrenheit (540° F.) and that was in the range of about four hundred degrees Fahrenheit to about five hundred degrees Fahrenheit (400° F. to 500° F.). Polypropylene was also used with good results at similar pressures and at temperatures above its melting point.

During filling of the airfoil, the airfoil is disposed in the mask 78 with the masking members 82, 84 urged against the airfoil by the first and second jaws 92, 94. As mentioned, the table or the lever might be adjusted slightly to accommodate any difference between the gap G and the gap G1. The mask members apply an external pressure to the airfoil which blocks the loss of laser blocking material which might pass through the flow directing surfaces of the airfoil to unwanted locations on the airfoil. The mask members also reinforce the thin wall of the airfoil (which in some cases may be as small as twenty (20) mils) against deflection as the high pressure polyethylene material flows through the airfoil.

The laser blocking material flows quickly into the interior of the airfoil, with filling of even complex shapes taking less than one-minute and some cases about thirty (30) seconds. A particular advantage is the relatively low melting temperature of the material. As a result, the thermal capacitance of the airfoil is such that it absorbs heat from the material without increasing in temperature by an amount which makes handling difficult. In some trials, operators were able to handle the airfoils after filling with bare hands or with light gloves.

Even though the material loses heat to the adjacent metal in the airfoil, the material continues to flow until it fills those areas that require the disposition of laser blocking material. Solidification of the material occurs rapidly as the material loses heat to the airfoil. As a result, the airfoil can then be moved to a new location even with shaking and without concern about the material liquefying.

Another advantage of the blocking material is the resiliency which it demonstrates in solid form. This allows for easy inspection of holes drilled by the laser to ensure that the laser has penetrated through to the blocking material. For example, one way of inspecting a hole to make sure the hole has been drilled through the wall of the airfoil, is to probe through the hole with a thin wire. The wire exhibits a different response on contact with the resilient polyethylene material as compared to the contact that it would have against a hard component, such as the material. In many cases, the laser blocking material has flowed into the hole to such an extent that visual inspection of the hole shows the presence of polyethylene, thereby confirming the existence of a through hole.

During the drilling of a hole with the laser beam L, the coherent radiation of the laser beam vaporizes a wall, of the airfoil, such as the suction wall 42 or pressure wall 44, to form a cooling air hole 46. As the laser beam breaks through the wall on the interior of the airfoil, the laser beam strikes the polyolefin (polyethylene) material disposed on the interior of the airfoil.

The polyolefin blocking material is particularly effective at preventing the laser beam from unacceptably damaging the walls on the interior of the airfoil. Although the phenomenon in not well understood, it is believed that the crystallinity of the polyolefins helps this process. It is also believed that the specific heat and melting point of the polyethylene is such that a small portion of the polyethylene immediately forms a fluid, either in gaseous form or in the form of a liquid, upon being struck by the laser beam. If gas, the polyethylene gas is formed of carbon and hydrogen, a combustible mixture, but with the no oxygen being supplied by the material (since the material itself is formed of only carbon and hydrogen). This avoids the formation of sooty particles.

The plasma of the vaporized polyethylene is transparent to the laser beam to such an extent that it apparently does not degrade the ability of the laser beam to finish the drilling of the hole. In addition, the fluid does not appear to degrade the formation of the hole and, in fact, moves into the hole and may enhance the ability of the laser to leave a clean hole without blocking of the hole as a result of splatter from molten wall material of the airfoil being sucked into the hole.

Experimental drilling operations have shown a marked decrease in wall blockage at completion of the drilling operation. The percent blocked holes in one run decreased from about fifty percent to sixty percent (50% to 60%) to less than ten percent (10%). This decreases the need for rework of the airfoil and promotes even distribution of cooling air in the finished article.

Another advantage of the polyethylene in laser drilling is believed to be the amount of diffusion of the laser radiation that takes place for an incremental thickness of polyethylene material. It is believed that it is greater than many other materials used for blocking laser radiation. This may be linked to the relatively high crystallinity of polyolefins which is greater than forty percent (40%) and for the Dowlex polyethylene material, greater than sixty percent (60%). It is believed that polyolefins are preferable to other polymers because of the Melt Flow Index which is greater than fifty (50) and the melting point which is sufficiently high such that the large quantities of laser blocking material are not completely melted by the laser beam. As a result, in some drilling operations an additional pulse of laser energy beyond that experienced using conventional wax fill is possible, which also helps form a clean exit hole with minimal blocking by backscatter of the airfoil material.

It is possible to combine with the polyolefin small amounts of other polymers. One example is less than about five percent (5%) by weight of the other polymers as long as the other polymers do not degrade the performance of the polyolefin and do not pose an environmental risk on burnout of the material.

The addition of these other polymers to the polyolefin, or even additional amounts of other material to the thermoplastic polymer, is a concern because thermoplastic polymers formed of only carbon and hydrogen provide a significant advantage during removal of laser blocking material after the holes are drilled in the airfoil. One method of removing the laser blocking material is to heat the laser blocking material until it burns. One satisfactory temperature is about thirteen hundred (1300° F.) degrees Fahrenheit. A particular advantage of the polyolefin family and particularly polyethylene is the polymer breaks down to form a highly combustible gas which is very clean burning. The carbon and hydrogen of the polyethylene combine with oxygen from the combustion atmosphere to form carbon dioxide and water vapor. This leaves behind a very clean airfoil that does not require further processing to remove contaminants from the interior of the airfoil. In addition, scrubbers for removing harmful gasses from the burnout operation are not required provided significant oxygen is present to completely combust the laser blocking material. Finally, burnout provides the advantage of not having to flow additional solvents into the blade or to manipulate the blades.

In addition, the polyolefins have a relatively low melting temperature, particularly the polyethylenes. As the airfoil is heated to a higher temperature to remove the polyethylene by burning the polyethylene, the polyethylene melts and runs out of orifices in the blade instead of continuing to expand and place unwanted internal pressures on the airfoil.

Finally, the polyethylene has a resiliency characteristic prior to melting that allows the material to deform upon being deflected under load. The polyethylene material expands prior to melting as it is heated during the burnout operation. Expansion of the solid polyethylene material causes the material to deform, and openings in the airfoil may even allow the material to extrude so that all forces generated by thermal expansion of the material are not transmitted to the walls of the airfoil. The relatively thin walls of the airfoil are not deflected to an extent that would cause harmful residual stresses in the airfoil or failure of the airfoil during the burnout operation. In addition, burnout may be provided at a relatively low temperature to speed handling or at higher temperatures to decrease processing time as long as the temperature does not degrade the performance of the alloy from which the airfoil is made.

Although the invention has been shown and described with respect to detailed embodiments thereof, it should be understood by those skilled in the art that various changes in form and detail may be made without departing from the spirit and scope of the claimed invention.

We claim:

1. A blocking material disposed on a portion of the interior of a component for attenuating the intensity of a laser beam that is directed at the component during a laser machining operation, which comprises:
   a thermoplastic polymer formed of only carbon and hydrogen which has a Melt Flow Index which is greater than or equal to thirty and which is partially amorphous and partially crystalline such that the crystallinity is greater than forty (40) percent to diffuse the beam of radiation from the laser.

2. The blocking material of claim 1 wherein the blocking material comprises a single polyolefin or a mixture of polyolefins.

3. The blocking material of claim 2 wherein the blocking material comprises a polyolefin selected from the group consisting of linear low density polyethylene (LLDPE), low density polyethylene (LDPE), high density polyethylene (HDPE), polypropylene (PP).

4. The blocking material as claimed in claim 2 wherein the blocking material in solid form has a resiliency characteristic such that the blocking material has some resiliency upon being deflected as compared to the component, wherein the material exhibits a different response upon being probed as compared to the component, and wherein the material deforms under load so that all forces of thermal expansion of the material are not transmitted to the component as the material expands under operative conditions during burn out operations.

5. The blocking material as claimed in claim 4 wherein the solid material has a melting point which is less than three hundred and fifty degrees Fahrenheit (350° F.) such that as the material is heated during a burnout operation, thermal expansion is terminated as a result of the material melting.

6. The blocking material as claimed in claim 2 wherein the blocking material in its molten condition has a shear thinning characteristic which is greater than zero.

7. The blocking material as claimed in claim 6 wherein the material, in the molten condition, has a shear thinning characteristic that causes an apparent decrease in viscosity which is greater than about fifty percent (50%) as measured for a viscosity at a pressure associated with a shear rate of twenty per second and the shear rate associated with a pressure of about fifteen hundred pounds per square inch (1500 psi) acting on the laser blocking material across an orifice in an airfoil.

8. The blocking material as claimed in claim 2 wherein the melting point of the blocking material and specific heat is such that at least a portion of the material is heated above the melting point by the laser beam and the material is in fluid form under operative conditions as the laser beam drills through a portion of the component to form a hole such that a portion of the material flows into the hole and solidifies after the laser drilling operation.

9. The blocking material as claimed in claim 8 wherein the fluid material is a liquid.

10. The blocking material as claimed in claim 8 wherein the fluid material is a gas and wherein the gaseous pyrolysis product is transparent to a laser beam to the extent that a plasma of vaporized polyethylene is transparent to the laser beam.

11. The blocking material as claimed in claim 2 wherein the blocking material comprises polyethylene.

12. The blocking material as claimed in claim 11 wherein the blocking material comprises a linear polyethylene having a specific gravity which is less than one (1.0).

13. The blocking material as claimed in claim 12 wherein the linear polyethylene is a low-density polyethylene and has specific gravity which is less than ninety five thousandths (0.95).

14. The blocking material as claimed in claim 12 wherein the polyethylene has a crystallinity which is greater than sixty percent (60%).

15. The blocking material as claimed in claim 2 wherein the melting point is greater than two hundred and fifty degrees Fahrenheit (250° F.) and less than five hundred and forty degrees Fahrenheit (540° F.) such that the material is removed by heating and melting after completion of the laser machining operation but is not vaporized at a low temperature by the laser beam.

16. A method of drilling a hole with a laser beam in a component having a cavity in flow communication with the drilled hole, comprising:
   disposing adjacent the planned opening of the hole into the interior of the cavity a laser blocking material which comprises a thermoplastic polymer formed of only carbon and hydrogen, which has a Melt Flow Index which is greater than or equal to thirty and which is partially amorphous and partially crystalline such that the crystallinity is greater than forty (40) percent to diffuse the beam of radiation from the laser drilling the hole with the laser beam;
   drilling the hole with the laser beam;
   removing the blocking material;
wherein the blocking material dissipates the energy of the laser beam.

17. The method of drilling a hole with a laser beam in a component having a cavity of claim 16 wherein the thermoplastic polymer includes a single polyolefin or a mixture of polyolefins.

18. The method of drilling a hole with a laser beam in a component of claim 17 wherein the step of disposing a single polyolefin or a mixture of polyolefins includes selecting the polyolefin from the group consisting of linear low density polyethylene (LLDPE), low density polyethylene (LDPE), high density polyethylene (HDPE), polypropylene (PP).

19. The method of drilling a hole with a laser beam in a component of claim 16 wherein the material has a melting point which is less than three hundred and fifty degrees Fahrenheit (350° F.); wherein the step of disposing the thermoplastic polymer on the interior of the component includes the step of melting the material prior to disposing the material in the airfoil; and, wherein the step of removing the blocking material includes the steps of disposing the component in an atmosphere having sufficient oxygen to form carbon dioxide and water as the products of the burnout operation, heating the material to a temperature that is greater than the melting point of the material such that thermal expansion of the material is terminated as a result of the material melting, and then continuing the heating of the material to a temperature that causes the carbon and hydrogen to react with oxygen.

20. The method of drilling a hole with a laser beam in a component of claim 19 wherein the step of removing the laser blocking the material includes disposing the airfoil in an environment that has a temperature that is greater than about one thousand degrees Fahrenheit (1000° F.).

21. The method of drilling a hole with a laser beam in component of claim 20 wherein the step of disposing the airfoil in a heated environment includes disposing the airfoil in an environment that has a temperature of about thirteen hundred degrees Fahrenheit (1300° F.).

22. A method of drilling a hole with a laser beam in a component of claim 16 wherein the step of diffusing the beam of radiation from the laser includes heating a portion of the solid laser blocking material above the melting point with the laser beam and causing the material to assume fluid form and further includes flowing a portion of the material into the hole and solidifying the material in the hole after the laser drilling operation.

23. A method of drilling a hole with a laser beam in a component of claim 22 wherein the method of drilling the hole by using a laser further includes inspecting the drilled hole by probing the hole with a thin, relatively hard instrument and impacting the material in the hole with the instrument and sensing that impact has occurred by the feeling of resiliency that the laser blocking material has as compared to the material of the component.

24. A method of drilling a hole with a laser beam in a compound of claim 22 wherein the step of melting a portion of the material as the laser beam strikes the material includes forming a gaseous pyrolysis product which is transparent to a laser beam to the extent that a plasma of vaporized polyethylene is transparent to the laser beam.

25. A method of drilling a hole with a laser beam in a compound of claim 16 wherein the step of disposing the thermoplastic polymer on the interior of the cavity includes disposing a material in the cavity in solid form that has a resiliency characteristic such that the blocking material has some resiliency upon being deflected as compared to the component, and wherein the material exhibits a different response upon being probed as compared to the component, and wherein the material deforms under load so that all forces of thermal expansion of the material are not transmitted to the component as the material expands under operative conditions during burn out operations.

26. The method of drilling a hole with a laser beam of claim 17 wherein the step of disposing the laser blocking material in the cavity includes disposing a material which in the molten condition has a shear thinning characteristic that causes an apparent decrease in viscosity which is greater than about fifty percent (50%) as measured for a viscosity at a pressure associated with a shear rate of twenty per second and the shear rate associated with a pressure of about fifteen hundred pounds per square inch (1500 psi) acting on the laser blocking material across an orifice in an airfoil.

27. The method of drilling a hole with a laser beam of claim 26 wherein the orifice has a hydraulic diameter which is less than forty (40) mils.

28. The method of drilling a hole with a laser beam of claim 27 wherein the orifice has a hydraulic diameter which is less than twenty five (25) mils.

* * * * *